Sept. 27, 1932.  L. LARUM  1,880,143

WIND WHEEL

Filed July 14, 1930   2 Sheets-Sheet 1

Inventor
Lars Larum
By Jacobi & Jacobi
Attorneys

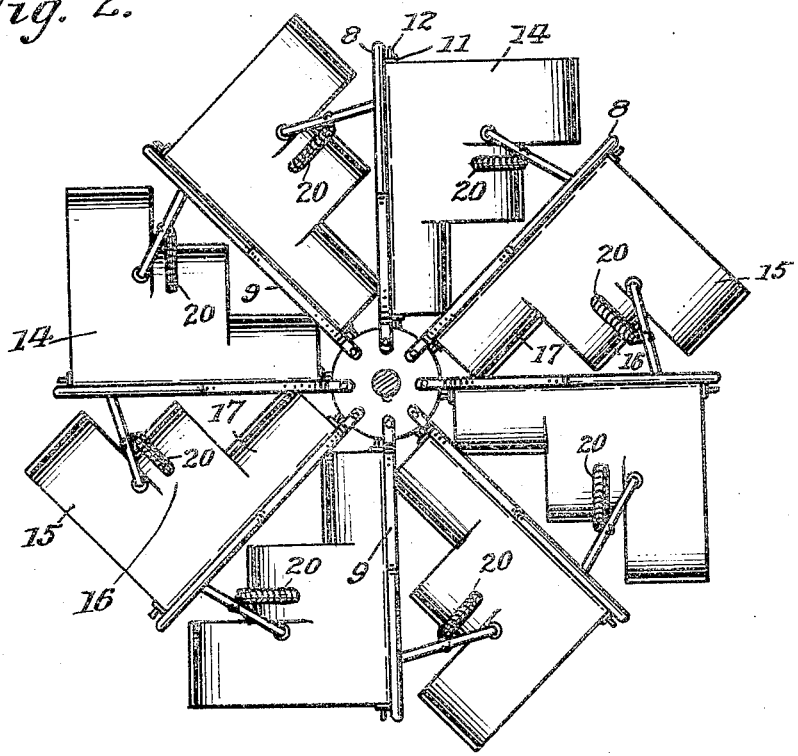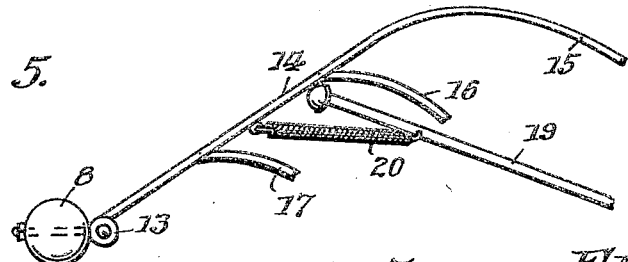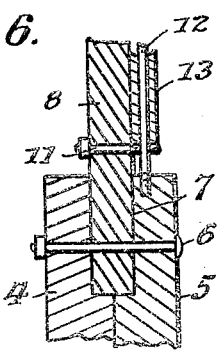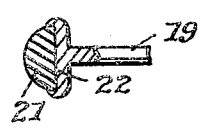

Patented Sept. 27, 1932

1,880,143

UNITED STATES PATENT OFFICE

LARS LARUM, OF McCABE, MONTANA

WIND-WHEEL

Application filed July 14, 1930. Serial No. 467,941.

My invention relates to new and useful improvements in wind mills and more particularly to a wind wheel therefor, the primary object of the invention being to provide an improved device of this character which will cause the mill to operate upon the slightest movement of the wind.

A further object of the invention resides in providing a wind wheel which will develop a maximum power from the slightest action of the wind.

Still another object of the invention resides in providing a wind wheel consisting of a plurality of blades, each blade being offset in a particular manner and curved to provide substantially a plurality of wings of different lengths.

Still another object of the invention resides in providing a means for spacing the blades definitely with respect to one another and arranging a yielding means in connection therewith to permit movement of the blades under the action of the wind but to return the blades to their normal position.

Still another object resides in providing a device of the character mentioned which is comparatively simple and durable in construction, inexpensive to manufacture and one which will be very efficient and useful in operation.

With these and numerous other objects in view my invention consists in the novel features of construction, combination and arrangement of parts as will be hereinafter referred to and more particularly pointed out in the specification and claims.

In the accompanying drawings forming a part of this application,

Figure 2 is a front elevation of the wind wheel with the shaft therefor in section.

Figure 5 is an edge elevation of one of the blades in position with a portion of the stop member of the preceding blade in contact therewith.

Figure 6 is a fragmentary section through the hub of the wheel.

Figure 7 is a fragmentary side elevation, partly in section of the end of one of the stop members, and Figure 8 is an end elevation thereof.

Figure 1:
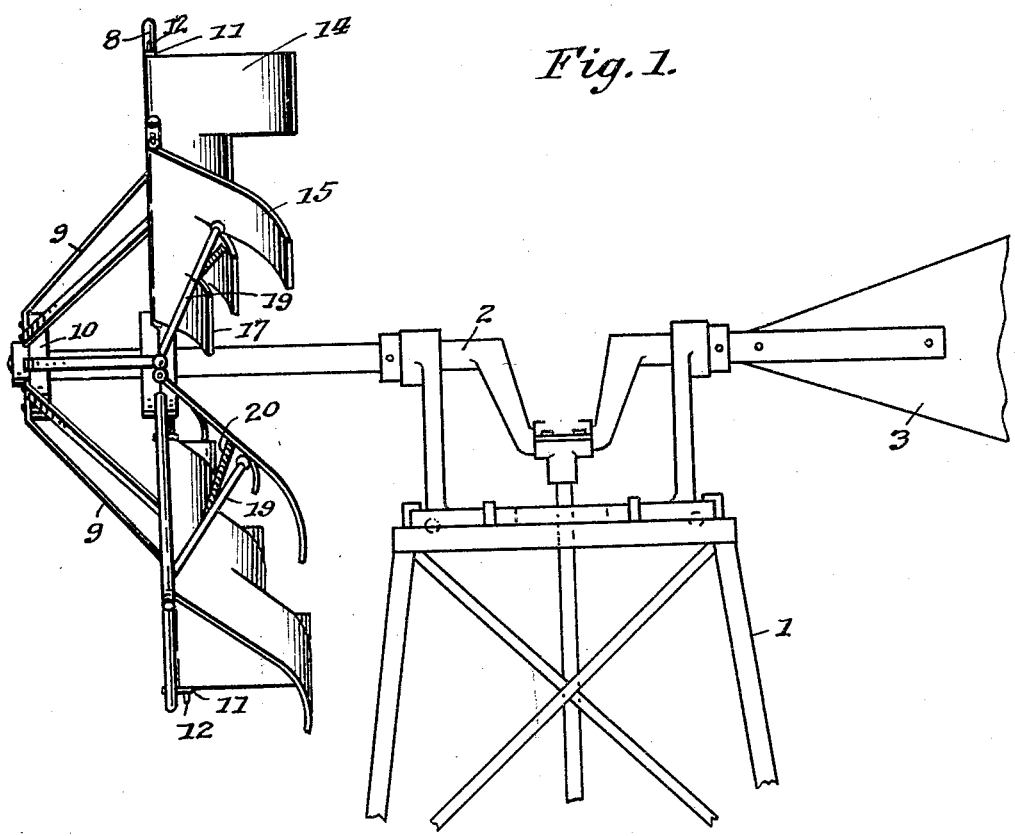
Figure 1 is a side elevation of a fragment of a wind tower with my improved wind wheel attached thereto.
Figure 4:
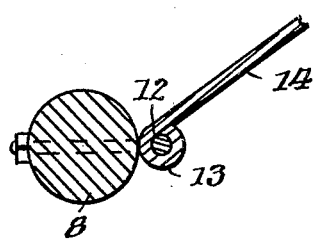
Figure 4 is a section through one of the shafts or arms carrying the blades.

In describing the invention I shall refer to the drawings, in which similar reference characters designate corresponding parts throughout the several views and in which 1 designates a tower of the usual or any preferred type used for wind mills upon which is supported the crank shaft 2, one end of said shaft having connected thereto in any preferred manner the rudder 3. To the opposite end of the shaft 2 is connected my improved wind wheel which will be hereinafter and more particularly described. A hub is provided composed of two complimentary elements 4 and 5 which are mounted on the shaft 2 and secured together by means of tie-bolts 6 which bolts also secure in sockets 7 formed radially in the members 4 and 5 the radial arms or rods 8. Upon these rods or arms 8 are adapted to be pivotally secured the blades, which will be hereinafter set forth in detail. In order to securely support the radial arms 8 in position brackets 9 are secured thereto at their one end and at the opposite end engaged with a hub 10 which is mounted adjacent the outer ends of the shaft 2, as clearly shown in Figure 1 of the drawings.

Figure 3:
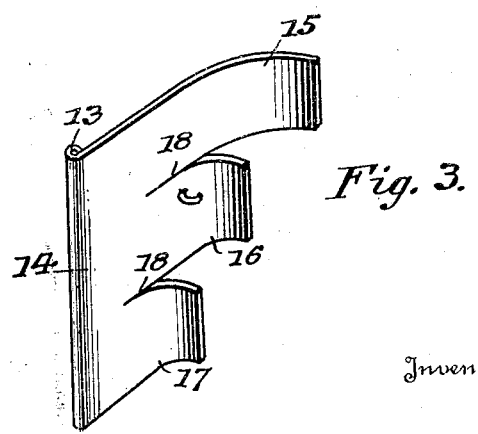
Figure 3 is a perspective view of one of the blades removed.

Extending through the arms 8 adjacent the outer ends thereof and also through their inner ends adjacent the hub elements 4 and 5 are the eye bolts 11 through which are extended pintles 12 the lower ends of said pintles being received securely in the peripheral edges of the hub element 5, as clearly shown in Figure 6. These pintles pivotally support on the arms 8 the tubular edges 13 of blades 14. The outer edge of each blade 14 is offset in stepped relation to provide substantially three wing-like elements 15, 16 and 17. The blade is slitted between the elements as shown at 18 and the ends of said elements 15, 16 and 17 are deeply curved, as clearly shown in Figures 3 and 5 so as to readily receive air currents thereagainst. Obviously the offsetting of these elements 15, 16 and 17 with respect to one another will permit the air currents to be readily directed to the blades so that said blades will receive the fullest extent of the air or wind currents and consequently develop the utmost power therefrom.

The blades 14 are adapted to be disposed with respect to one another at a particular angle, such as shown in Figure 1 of the drawings. In order to normally retain the blades in this position with respect to one another, I provide specific retaining means therefor. Secured in any preferred manner to each of the arms or rods 8 is a rod 19 which is directed rearwardly toward the preceding blades and adapted to contact with a portion of the element 15 thereof. A coil spring 20 has one end thereof engaged with the rod 19 and the opposite end engaged with an eye or in any other manner with the preceding blade, as clearly shown in Figures 1, 2 and 5 so that under normal conditions each blade is in abutment with the head of the rod 19 which acts as a stop rod. When wind currents are directed toward the blades the latter are moved slightly against the tension of the springs 20 but will return to their normal positions when the spring action overcomes the wind currents, the heads of the rods 19 acting as a stop to said blades. In order to prevent an undue amount of noise upon the return of each blade to its abutting position against the stop rods, I provide the rod 19 with a buffer head 21 formed of rubber or any other similar material which is carried in a socket 22 formed in the end of the rod 19.

From the foregoing description of the construction of my improved device, the operation thereof and the manner of assembly of same will be readily understood. It will further be seen that I provided a simple, inexpensive and efficient means for carrying out the objects of the invention.

While I have particularly described the elements best adapted to perform the functions set forth, it is obvious that various changes in form, proportion and in the minor details of construction may be resorted to within the scope of the appended claims, without departing from the spirit or sacrificing any of the principles of the invention.

Having thus described the invention, what is claimed is.

1. A wind wheel comprising a hub, radial arms mounted thereon, blades pivotally carried on said arms, a stop rod projecting laterally from each of said arms with its inner end rigidly fixed to the arm and its outer end free and adapted to abut the blade on the preceding arm, and coil spring members, each having one end secured to one of said stop rods intermediate the ends thereof and having its opposite end secured to the preceding blade to normally retain the latter in yielding contact with the free end of said stop rod, as and for the purposes described.

2. A wind wheel comprising a hub, radial arms rigidly secured thereon, blades pivotally mounted on said arms, a stop rod projecting laterally from each of said arms adjacent the outer end thereof with its inner end rigidly fixed to the arm and its outer end free and adapted to abut the blade on the preceding arm, the outer blade-abutting ends of said rods being provided with buffer heads thereon, and a plurality of coil springs, each having one end loosely engaged with the intermediate portion of a stop rod and its opposite end engaged with an intermediate portion of the preceding blade to yieldingly retain the blade in abutting relation with the rod.

In testimony whereof I affix my signature.

LARS LARUM.